Feb. 20, 1934.  A. C. WINTEMBERG  1,948,250
RAILWAY TRUCK
Filed Feb. 11, 1928   2 Sheets-Sheet 1
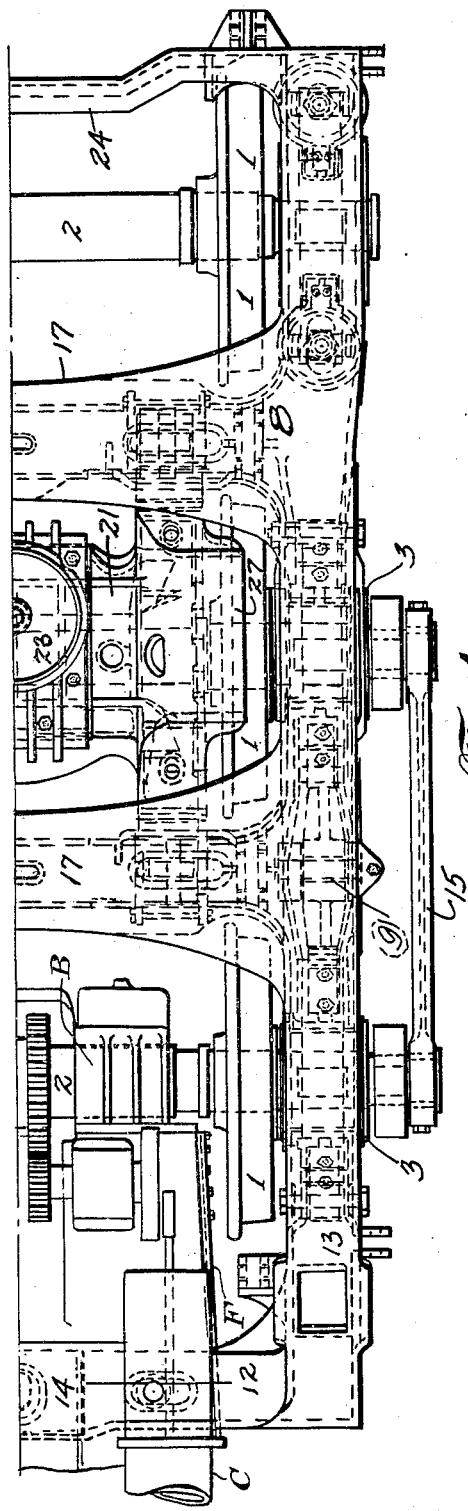
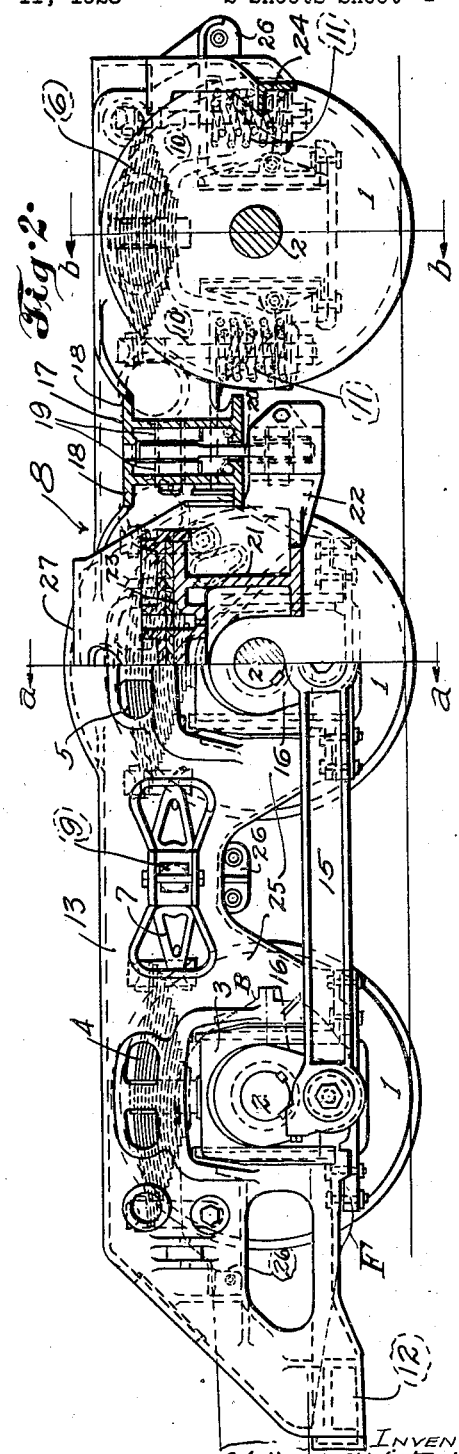
INVENTOR
Adelbert C. Wintemberg
By Cornwall, Bedell & James
ATTORNEYS Feb. 20, 1934.  A. C. WINTEMBERG  1,948,250
RAILWAY TRUCK
Filed Feb. 11, 1928  2 Sheets-Sheet 2
Fig. 3.
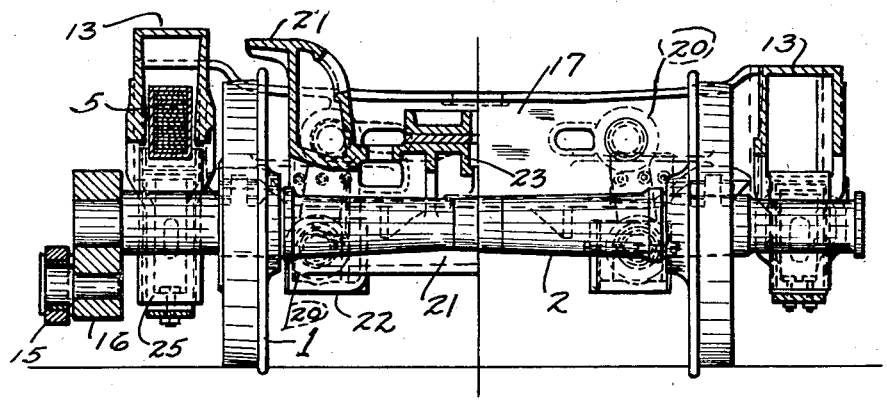
Fig. 5.
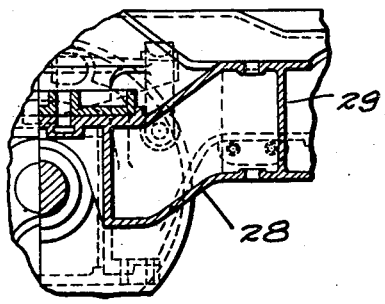
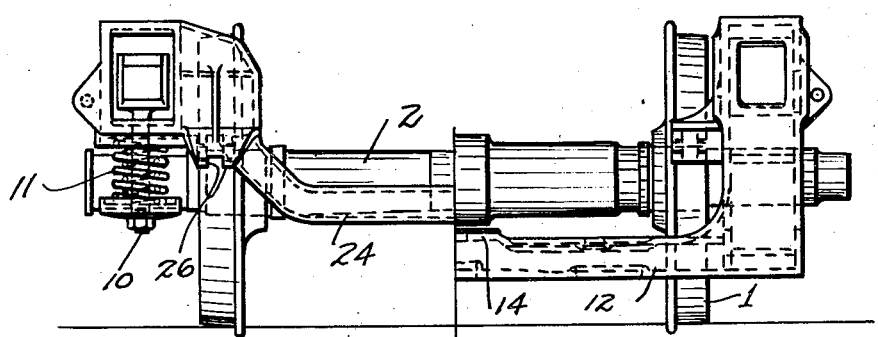
Fig. 4.
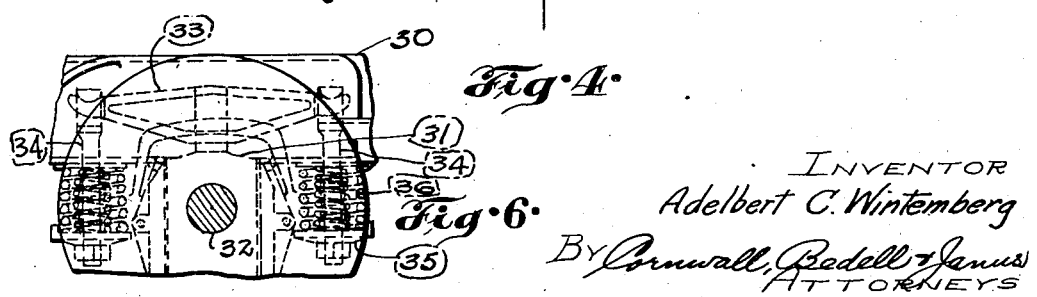
Fig. 6.
INVENTOR
Adelbert C. Wintemberg
By Cornwall, Bedell & Janney
ATTORNEYS Patented Feb. 20, 1934

1,948,250

UNITED STATES PATENT OFFICE 1,948,250

RAILWAY TRUCK

Adelbert C. Wintemberg, St. Louis, Mo., assignor, by mesne assignments, to General Steel Castings Corporation, Granite City, Ill., a corporation of Delaware Application February 11, 1928. Serial No. 253,659

13 Claims. (Cl. 105—196)

My invention relates to railway rolling stock and consists in an improved truck construction.

One of the objects of my invention is to provide a six wheel truck with a booster motor which preferably is operatively connected to two axles of the truck while at least one other axle is an idler axle. Another object of my invention is to provide a truck having more than two axles and in which the load is applied to at least one of the axles more or less independently of the application of the load to the other axles. To accomplish this, I provide two spring equalizing systems on each side of the frame instead of the usual single system for all of the axles. One system is supported by two axles operatively connected to a booster motor and the other system is supported by the idler axle. This positions the center of one spring system between the two booster driven axles and positions the center of the other spring system over the idler axle and makes possible more desirable distribution of weight than can be obtained with a single spring system in which the center of the spring system would be near to the center axle and any variation due to the shifting of the loads on account of track irregularities, etc. would tend to lighten the load on one of the booster driven axles, thereby affecting the tractive efficiency of the wheels.

Other objects of my invention are to provide a suitable frame and bolster for a truck of the class described, the elements of which structure will be set forth in the detailed description of my truck.

In the accompanying drawings which illustrate a selected embodiment of my invention—

Figure 1 is a top view of a longitudinal half of my improved truck.

Figure 2 is in part a side elevation and in part a vertical longitudinal section of the truck.

Figure 3 is a vertical transverse section, the lefthand portion being taken on line a—a of Figure 2 and the righthand portion being taken on line b—b of Figure 2.

Figure 4 is an end elevation, the lefthand portion being an elevation of the righthand end of the truck as shown in Figures 1 and 2 and the righthand portion of Figure 4 being an end elevation of the lefthand end of the truck as shown in Figures 1 and 2.

Figure 5 is a fragmentary section illustrating a modified construction.

Figure 6 is a detail elevation illustrating another modification.

The truck wheels 1, axles 2, and journal boxes 3 are of any ordinary construction and form no part of my present invention.

The journal boxes carry individual leaf springs 4, 5, and 6 and the adjacent ends of springs 4 and 5 are connected by an equalizing lever 7. Each side of the truck frame 8 is supported at five points, namely, at the outer ends of springs 4 and 5, at the fulcrum pin 9 for the equalizer 7, and at the ends of springs 6 through links 10 which depend from the ends of springs 6 and carry coil springs 11 which engage the underside of frame 8. Thus the two lefthand axles support the frame through an equalizing system while the righthand axle supports the frame through a spring or another equalizing system independently of the first equalizing system. Most of the supporting elements are housed in the wheel pieces of the truck frame and are thereby protected and are out of the way of brake rigging and facilitate inspection of the latter.

This arrangement is particularly desirable in connection with the use of a booster motor and I illustrate the application of such a motor to the lefthand axle 2, the motor bed or frame F being supported by this axle through spaced bearings B and by the box-shaped end rail 12 which connects the wheel pieces 13 of the truck frame and is provided intermediate its ends with a pad 14 forming a third point support for mounting the booster motor frame at the longitudinal center line of the truck. The motor is of familiar design and includes steam cylinders C disposed longitudinally of the truck and having the usual pistons, connecting rods, cross heads, crank shaft and gearing, such as disclosed in Ingersoll Patent No. 1,339,395, issued May 11, 1920.

The booster motor drives the middle axle of the truck through a connecting rod 15 extending between cranks 16 formed on this axle and on the lefthand axle to which the motor is directly connected.

Preferably the wheel pieces 13 of the frame are box-shaped in cross section and house the springs 4, 5, and 6, the equalizer 7 and the other elements which connect the springs to the equalizer and to the truck frame. The wheel pieces are connected by spaced transoms 17 which are preferably box-shaped in cross section and provided with suitable flanges 18, for reinforcing purposes and with bearings 19 for pivotally mounting hangers 20. I provide an H-shaped bolster for the truck, including a center portion 21 of inverted U-shape in cross section and adapted to accommodate the center axle of the truck and having side bearings 27 and longitudinally and downwardly projecting legs 22 of box-section extending under the transoms 17 and swingingly supported therefrom by means of the hangers 20. The bolster includes a center plate or center plate mounting section 23 which is mounted asymmetrically of the truck axles, being located between the middle axle and the righthand axle of the truck whereby a greater proportion of the superimposed weight will be distributed to these two axles thereby balancing the additional weight which is placed on the left hand axle by reason of the support of the booster motor thereby. The righthand end of the truck frame preferably includes an end rail 24 connecting the wheel pieces but this end rail is much lighter than rail 12 which carries the booster motor. Preferably, the truck frame is formed of a one-piece casting with integral pedestals 25 and integral brake hanger brackets 26.

I also preferably form the bolster of a one-piece casting and this construction provides for maximum strength with a minimum amount of material and avoids the expense of machining and assembling a number of elements such as will be required in a built-up structure.

It will be understood that many of the features of my invention may be embodied in a truck having a bolster formed integrally or otherwise rigid with the frame, in which case the legs of the center bolster will merge with the transoms instead of being suspended therefrom by use of the swinging links, such a structure being indicated in Figure 5 in which the bolster legs 28 extend upwardly and unite with the transom 29 instead of extending beneath the transom as shown in the preferred construction. Otherwise the truck structure is substantially the same as illustrated in Figures 1 to 4.

In Figure 6, I illustrate a modification of my invention in which the truck frame 30 is mounted upon the journal box 31 and the axle 32 by means of a rigid equalizer bar 33, which carries the two links 34 suspending the seats 35 for the frame supporting springs 36. The equalizer 33 and the upper portions of the links 34 are housed in the wheel piece of the frame similar to the arrangement of the equalizing spring 6 shown in Figure 2.

It will be understood that Figure 1 illustrates a preferred arrangement in which two of the axles are driving axles because of the booster motor and the connecting rod 15. It will be understood that the connecting rod can be omitted and that the booster motor could be applied to a single one of the axles leaving two idler axles. If desired, all three axles could be connected so as to provide three driving axles.

While I have designed the truck illustrated in my drawings particularly for use in a locomotive tender, it will be understood that its field of use is not limited to such an application, and I contemplate the exclusive use of my invention as expressed in my claims irrespective of the nature of the rolling stock to which it is applied and irrespective of modifications in the details of its construction, other than those described.

I claim:

1. In a truck frame, wheel pieces provided with pedestals, spaced transoms located between said pedestals and connecting said wheel pieces, and an end rail at the level of the lower portions of said pedestals provided with a seat for a booster motor, and a connection between said rail and said wheel pieces in addition to the connection afforded by the adjacent end pedestals.

2. A one-piece casting forming a truck frame with integral wheel pieces, pedestals, spaced transoms connecting said wheel pieces and located between said pedestals, an end rail at the level of the lower portions of said pedestals connecting said wheel pieces and provided with a booster motor seat, and a connection between said rail and said wheel pieces in addition to the connection afforded by the adjacent end pedestals.

3. A one-piece casting forming a truck frame with integral box-shaped wheel pieces, pedestals, spaced box-shaped transoms connecting said wheel pieces and located between said pedestals, and a box-shaped end rail connecting said wheel pieces and provided with a booster motor seat.

4. In a railway truck, three spaced axles provided with journal boxes, an individual spring mounted on each of said boxes, an equalizer connecting adjacent ends of two of said springs on the same side of the truck, a rigid truck frame housing said springs and equalizer and carried by said equalizer and the other ends of said connected springs, and elements anchoring both the ends of the third spring on the same side of the truck to said frame.

5. In a six wheel truck, a truck frame, two driver axles and an idler axle supporting said truck frame, and a booster motor at one end of the truck carried on one of said driver axles and on the top of said frame near said driver axle.

6. In a six wheel truck, a truck frame including an end rail, two driving axles near said end rail, and an idler axle near the opposite end of said frame, said frame being supported on all of said axles, and a booster motor carried on said end rail and the adjacent driving axle.

7. In a six wheel truck, a truck frame including an end rail, two driving axles near said end rail, an idler axle near the opposite end of said frame, a booster motor supported on said end rail, an equalizing system distributing at least a part of the weight of said booster to said driving axles, and elements for distributing the superimposed weight on said frame to all of said axles.

8. In a six wheel truck, axles, a frame, a booster motor comprising a longitudinally disposed steam cylinder supported on one end of said frame and an end axle of the truck, and a bolster carried by said frame and including a center plate located between the other two axles of the truck.

9. In a six wheel railway truck, a pair of axles, an equalizing system for supporting the truck frame upon said axles, a third axle, means supporting said frame from said third axle independently of said equalizing system, and a booster motor comprising a horizontally disposed steam cylinder operatively connected to at least one axle of said pair of axles and carried on the portion of said frame near said equalizing system.

10. In a railway six wheel truck, a rigid truck frame, having hollow wheel pieces, an equalizing system positioned in said wheel pieces and supporting said frame from two of said axles, and supporting means positioned in said wheel pieces and supporting said frame from the third axle independently of said system.

11. In a truck, a frame having wheel pieces provided with pedestals and spaced transoms located between said pedestals and connecting said wheel pieces and also provided with an end rail at the level of the lower portions of said pedestals, and a booster motor supported on said end rail and below the level of said wheel pieces.

12. A one piece casting forming a truck frame with integral wheel pieces, spaced pedestals on each of said wheel pieces, spaced transoms connecting said wheel pieces and located between said pedestals, and an end rail connecting said wheel pieces and adapted to support a booster motor on its upper face and below the level of said wheel pieces.

13. A one piece casting forming a truck frame with integral box shaped wheel pieces, spaced pedestals on each of said wheel pieces, spaced box shaped transoms connecting said wheel pieces and located between said pedestals, and a box shaped end rail connecting said wheel pieces and adapted to support a booster motor.

ADELBERT C. WINTEMBERG.